United States Patent
Gauthie et al.

(10) Patent No.: US 8,567,150 B2
(45) Date of Patent: Oct. 29, 2013

(54) AIRCRAFT PRESSURIZED FLOOR

(75) Inventors: Laurent Gauthie, Tounefeuille (FR); Phillippe Bernadet, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 561 days.

(21) Appl. No.: 12/301,982

(22) PCT Filed: May 16, 2007

(86) PCT No.: PCT/EP2007/004412
§ 371 (c)(1),
(2), (4) Date: Jul. 16, 2010

(87) PCT Pub. No.: WO2007/134790
PCT Pub. Date: Nov. 29, 2007

(65) Prior Publication Data
US 2010/0282903 A1    Nov. 11, 2010

(30) Foreign Application Priority Data
May 23, 2006    (FR) ..................... 06 51892

(51) Int. Cl.
*E04B 5/10*    (2006.01)
(52) U.S. Cl.
USPC ....................... 52/650.3
(58) Field of Classification Search
USPC ............... 52/838, 841, 650.3, 407.2, 506.07; 244/119, 117 R, 132
See application file for complete search history.

(56) References Cited

U.S. PATENT DOCUMENTS

| | | | |
|---|---|---|---|
| 1,343,707 A * | 6/1920 | Carns | 244/123.8 |
| 1,438,685 A | 12/1922 | Belcher | |
| 1,541,976 A | 6/1925 | Longren | |
| 1,545,129 A | 7/1925 | Cook, Jr. | |
| 1,555,409 A | 9/1925 | Gilmore | |
| 1,619,372 A | 3/1927 | Adolf | |
| 1,765,189 A | 6/1930 | Woolgar, Jr. | |
| 1,775,386 A | 9/1930 | Joseph | |
| 1,790,144 A | 1/1931 | Haller | |
| 1,799,889 A | 4/1931 | Claudius | |
| 1,810,762 A | 6/1931 | Gish | |
| 1,814,556 A | 7/1931 | Jewett, Jr. | |

(Continued)

FOREIGN PATENT DOCUMENTS

| | | |
|---|---|---|
| DE | 676459 | 6/1939 |
| DE | 687456 | 6/1940 |

(Continued)

OTHER PUBLICATIONS

French Search Report for French Application No. FR0858417 dated Jul. 20, 2009.

(Continued)

*Primary Examiner* — Christine T Cajilig
(74) *Attorney, Agent, or Firm* — Patterson Thuente Pedersen, P.A.

(57) ABSTRACT

The invention concerns a pressurized flooring for aircraft, provided with beams (1) including an upper sole (2), a vertical web plate (3), and a lower sole (4), the lower sole being provided with two oblique feet (7, 8) arranged on both sides of the vertical web plate and presenting a support surface (14, 15) provided for supporting pressurized curved membranes (9), characterized in that the lower sole includes a linking element (10) connecting the two oblique feet, so that said lower sole presents an enclosed section. Such a structure can be advantageously realized in composite material.

20 Claims, 3 Drawing Sheets

(56) References Cited

U.S. PATENT DOCUMENTS

| | | | |
|---|---|---|---|
| 1,829,922 A | 11/1931 | Cams | |
| 1,988,079 A | 1/1935 | Knut | |
| 2,006,468 A | 7/1935 | Longren | |
| 2,081,490 A | 5/1937 | Marski | |
| 2,147,654 A * | 2/1939 | Knight | 244/13 |
| 2,171,434 A | 8/1939 | Ragsdale et al. | |
| 2,308,943 A * | 1/1943 | Tietig et al. | 52/781 |
| 2,347,542 A | 4/1944 | Cyron et al. | |
| 2,382,357 A | 8/1945 | Michael | |
| 2,382,817 A | 8/1945 | Reiss | |
| 2,416,245 A | 2/1947 | Waiter et al. | |
| 2,430,643 A | 11/1947 | Marhoefer | |
| 2,540,482 A | 2/1951 | Hervey | |
| 2,593,714 A * | 4/1952 | Robinson | 156/156 |
| 2,779,558 A * | 1/1957 | Hereil et al. | 244/119 |
| 2,791,386 A | 5/1957 | Howard | |
| 2,902,597 A | 9/1959 | Leidy et al. | |
| 2,973,073 A | 2/1961 | Elliott | |
| 3,079,649 A * | 3/1963 | Willatts | 52/841 |
| 3,249,327 A | 5/1966 | Smith, Jr. | |
| 3,256,670 A * | 6/1966 | Tersigni | 52/634 |
| 3,361,401 A | 1/1968 | Hanifan | |
| 3,385,015 A * | 5/1968 | Hadley | 52/223.8 |
| 3,436,038 A | 4/1969 | Cox et al. | |
| 3,440,976 A | 4/1969 | Burne | |
| 3,640,491 A | 2/1972 | Harrison | |
| 3,727,870 A | 4/1973 | Bass | |
| 4,198,018 A | 4/1980 | Brault | |
| 4,200,946 A | 5/1980 | Lawrence | |
| 4,310,132 A * | 1/1982 | Frosch et al. | 244/119 |
| 4,479,621 A | 10/1984 | Bergholz | |
| 4,674,712 A | 6/1987 | Whitener et al. | |
| 4,776,534 A | 10/1988 | Bamford | |
| 4,909,655 A | 3/1990 | Anderson | |
| 5,086,996 A * | 2/1992 | Roeder et al. | 244/119 |
| 5,088,661 A | 2/1992 | Whitener | |
| 5,171,510 A | 12/1992 | Barquet et al. | |
| 5,301,914 A | 4/1994 | Yoshida et al. | |
| 5,496,001 A | 3/1996 | Skow | |
| 5,534,354 A | 7/1996 | Gregg et al. | |
| 5,542,626 A | 8/1996 | Beuck et al. | |
| 5,553,437 A * | 9/1996 | Navon | 52/837 |
| 5,806,797 A | 9/1998 | Micale | |
| 5,954,111 A | 9/1999 | Ochoa | |
| 6,070,831 A | 6/2000 | Vassiliev et al. | |
| 6,105,902 A | 8/2000 | Pettit | |
| 6,114,050 A | 9/2000 | Westre et al. | |
| 6,170,157 B1 | 1/2001 | Munk et al. | |
| 6,250,361 B1 | 6/2001 | Ochoa | |
| 6,364,250 B1 | 4/2002 | Brinck et al. | |
| 6,474,600 B1 | 11/2002 | Apps | |
| 6,539,571 B1 | 4/2003 | Forsyth | |
| 6,554,225 B1 | 4/2003 | Anast et al. | |
| 6,804,927 B2 | 10/2004 | Forsyth et al. | |
| 6,834,833 B2 | 12/2004 | Sankrithi | |
| 6,926,235 B2 | 8/2005 | Ouellette et al. | |
| 7,163,178 B2 | 1/2007 | Ricaud | |
| 7,234,667 B1 | 6/2007 | Talmage, Jr. | |
| 7,316,372 B2 | 1/2008 | Sarpy | |
| 7,407,134 B2 | 8/2008 | Bietenhader | |
| 7,597,287 B2 | 10/2009 | Gay | |
| 7,775,478 B2 | 8/2010 | Wood et al. | |
| 7,891,608 B2 | 2/2011 | Rawdon et al. | |
| 8,025,253 B2 | 9/2011 | Sprenger | |
| 2005/0230528 A1 | 10/2005 | Gay | |
| 2005/0230538 A1 | 10/2005 | Sarpy | |
| 2006/0006284 A1* | 1/2006 | Vetillard et al. | 244/119 |
| 2006/0065773 A1 | 3/2006 | Grant | |
| 2006/0108477 A1 | 5/2006 | Helou, Jr. | |
| 2007/0193199 A1* | 8/2007 | Carlson et al. | 52/729.1 |
| 2008/0078129 A1 | 4/2008 | Wood et al. | |
| 2008/0264936 A1 | 10/2008 | Godenzi | |
| 2008/0272236 A1 | 11/2008 | Rawdon et al. | |
| 2008/0283665 A1 | 11/2008 | Rouyre | |
| 2009/0026770 A1 | 1/2009 | Huntemann | |
| 2009/0121082 A1 | 5/2009 | Godenzi | |
| 2009/0146007 A1 | 6/2009 | Keeler et al. | |
| 2009/0173826 A1 | 7/2009 | Estell et al. | |
| 2009/0230241 A1 | 9/2009 | Heller et al. | |
| 2009/0236472 A1 | 9/2009 | Wood | |
| 2009/0294587 A1 | 12/2009 | Ricaud et al. | |
| 2009/0302157 A1 | 12/2009 | Ricaud | |
| 2009/0324356 A1 | 12/2009 | Schulze et al. | |
| 2010/0001129 A1 | 1/2010 | Guering | |
| 2010/0012773 A1 | 1/2010 | Im | |
| 2010/0032520 A1 | 2/2010 | Mauran et al. | |
| 2010/0032523 A1 | 2/2010 | Gallant et al. | |
| 2010/0038024 A1 | 2/2010 | Brandt | |
| 2010/0108808 A1 | 5/2010 | Allain et al. | |
| 2010/0116932 A1 | 5/2010 | Helou, Jr. | |
| 2010/0140403 A1 | 6/2010 | Barre et al. | |
| 2010/0163669 A1 | 7/2010 | Im | |
| 2010/0187352 A1 | 7/2010 | Yavilevich | |
| 2011/0001006 A1 | 1/2011 | Delahaye et al. | |
| 2011/0001008 A1 | 1/2011 | Delahaye et al. | |
| 2011/0180657 A1 | 7/2011 | Gionta et al. | |

FOREIGN PATENT DOCUMENTS

| | | |
|---|---|---|
| DE | 1060264 | 6/1959 |
| DE | 29713530 | 9/1997 |
| DE | 19841799 | 7/1999 |
| EP | 1564141 | 8/2005 |
| EP | 1614625 | 1/2006 |
| FR | 512 728 | 1/1921 |
| FR | 933229 | 4/1948 |
| FR | 1004041 | 3/1952 |
| FR | 2689851 | 10/1993 |
| FR | 2863673 | 6/2005 |
| FR | 2900125 | 10/2007 |
| GB | 110 433 | 10/1917 |
| GB | 367048 | 2/1932 |
| GB | 439954 | 12/1935 |
| GB | 494936 | 11/1938 |
| GB | 2196922 | 5/1988 |
| GB | 2196923 | 5/1988 |
| GB | 2268461 | 1/1994 |
| GB | 2320002 | 6/1998 |
| JP | 2003342957 | 12/2003 |
| WO | WO2004/080833 | 9/2004 |
| WO | WO2006/001860 | 1/2006 |
| WO | WO2007/122096 | 11/2007 |
| WO | WO2008/043940 | 4/2008 |

OTHER PUBLICATIONS

French Search Report for French Application No. FR0403089 dated Sep. 16, 2004.
French Search Report for French Application No. FR0450452 dated Sep. 17, 2004.
International Search Report for International Application No. PCT/FR2007/052081 dated Apr. 23, 2008.
French Search Report for French Application No. FR0753637 dated Oct. 16, 2007.
International Search Report and Written Opinion for International Application No. PCT/EP2007/053419 dated May 30, 2007.
Application and File History for U.S. Appl. No. 11/070,648, filed Mar. 2, 2005, inventor Sarpy.
Application and File History for U.S. Appl. No. 11/090,477, filed Mar. 25, 2005, inventor Gay.
Application and File History for U.S. Appl. No. 12/042,508, filed Mar. 5, 2008, inventor Godenzi.
Application and File History for U.S. Appl. No. 12/297,604, filed Mar. 9, 2009, inventors Ricaud et al.
Application and File History for U.S. Appl. No. 12/444,972, filed Jul. 22, 2009, inventors Gallant et al.
Application and File History for U.S. Appl. No. 12/634,311, filed Dec. 9, 2009, inventor Barre et al.

* cited by examiner

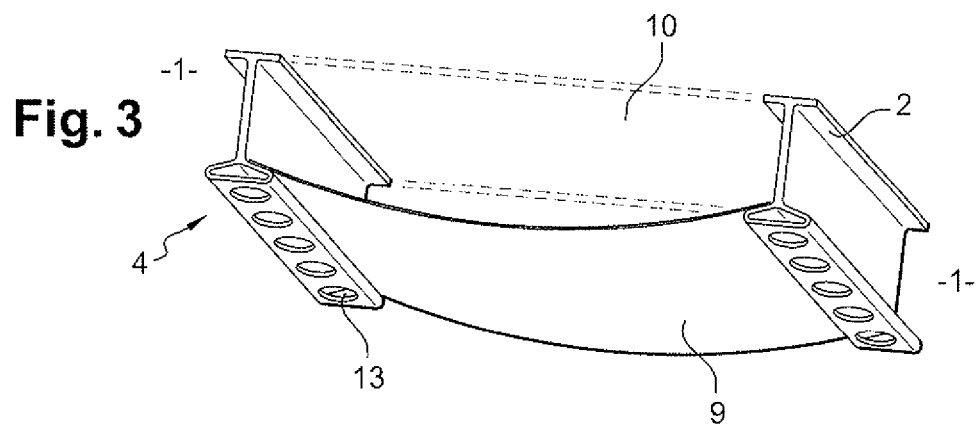
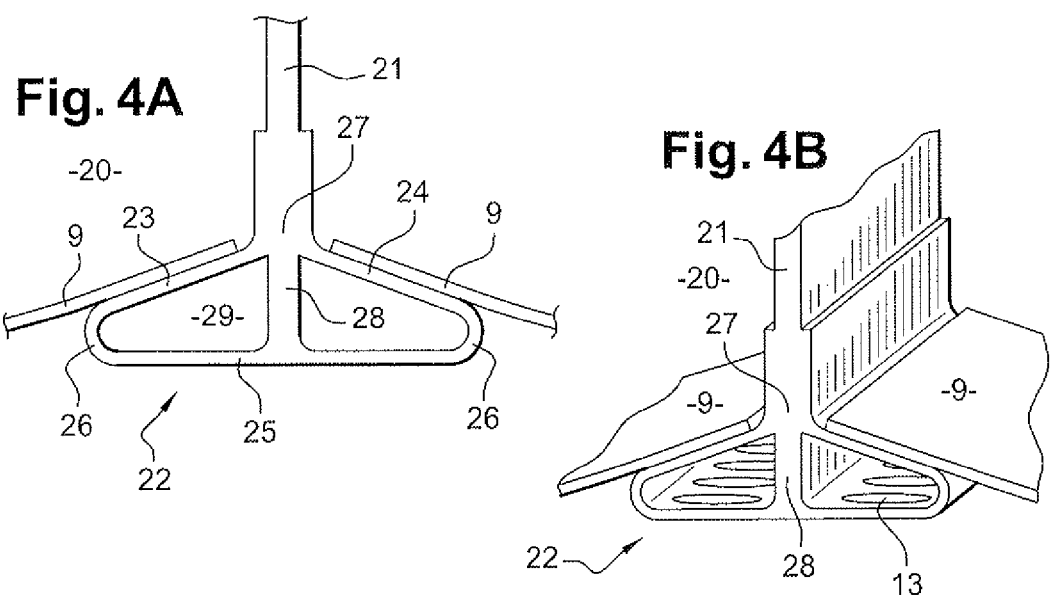
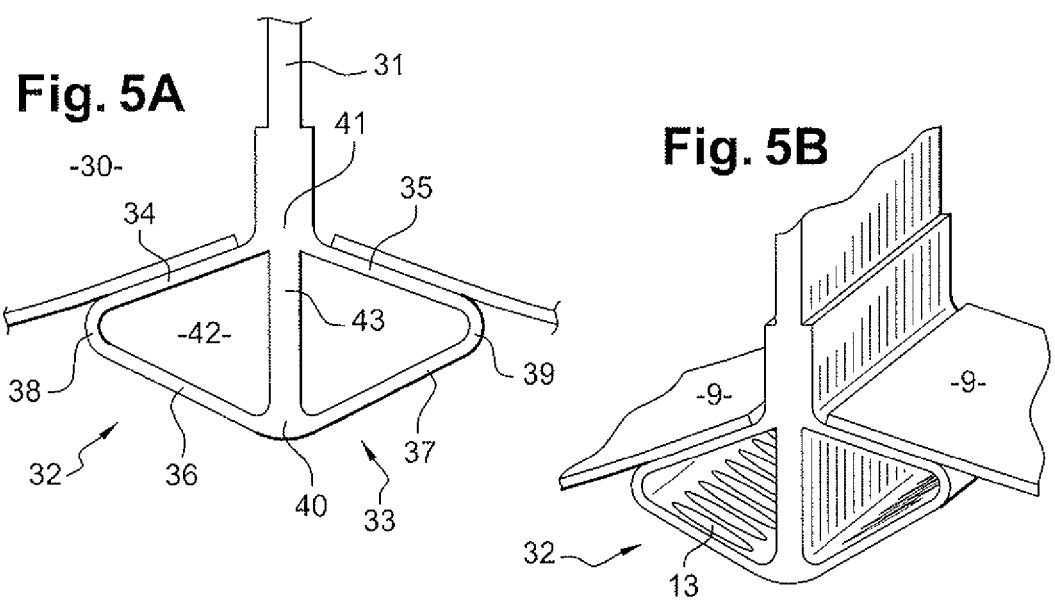

AIRCRAFT PRESSURIZED FLOOR

RELATED APPLICATIONS

This application claims priority to PCT Application No. PCT/EP2007/004412, filed May 16, 2007, and French Application No. 0651892 filed May 23, 2006, the disclosures of which are hereby incorporated herein by reference in their entirety.

TECHNICAL FIELD

The invention concerns an aircraft pressurized floor. More precisely, the invention concerns the lower sole of a beam for pressurized floor, intended to support a curved membrane of aforesaid floor.

The beam for pressurized flooring according to the invention finds applications in aircraft manufacture, and more particularly of the aircraft section provided with the main undercarriage housing located just behind the fuselage central compartment. Indeed, at the level of this aircraft section, the flooring beams have a particular shape to support, on an upper face on the one hand, the cabin flooring on which is installed the passenger seat rails and, on the other hand, to ensure tightness between the outside and the inside of the aircraft, on the lower face.

BACKGROUND

Currently, in an aircraft section including an undercarriage housing, the pressurized flooring includes a series of metallic beams arranged longitudinally in relation to the aircraft axis, and parallel to one another. Each beam includes an upper sole, intended to support the seat rails and a lower sole, intended to support the curved membranes that ensures cabin flooring tightness. A vertical web plate connects the upper sole to the lower sole. The lower sole is provided with two oblique feet arranged on each side of the vertical web plate and forming an inverted V in order to offer, for the face directed toward the upper sole, a support surface tangent to the curvature of the curved membranes.

In flight, the oblique feet of the lower sole are submitted to unfolding constraints. By unfolding constraint, one understand the forces having a tendency to flatten the beam, i.e. compression forces, forcing the oblique feet in the extension of the vertical web plate, and pull-out forces, tending to separate the feet away from one another, spreading them in a horizontal plane. The junction node between the two oblique feet and the vertical web plate is thus a particularly fragile zone of the beam for pressurized floor.

Currently, in aeronautics, one tries to use composite materials to manufacture all or portions of the parts entering in an aircraft manufacture, notably to decrease the overall mass of the aircraft. However, it is not currently possible to consider realizing such a beam for flooring pressurized in composite material, since such material is known to have less resistance to unfolding constraints.

SUMMARY OF THE INVENTION

The invention provides an alternative to beams for pressurized flooring as they are known in the state of the art, notably to allow the use of composite materials.

In order to do that, with the invention, we propose to realize a pressurized flooring with beams which oblique support areas for the lower sole, intended to support the pressurized flooring curved membranes, are connected by an intermediate piece so as to close the lower sole volume. The lower sole of the beams form thus a closed structure in which the forces exerted on the oblique support surfaces are re-looped. The lower sole according to the invention includes at least three elements delimiting an enclosed volume. The shape of the lower sole permits to get the oblique support surfaces to operate mainly at the level of their link with the intermediate piece so that the junction node between the oblique support surfaces and the vertical web plate no longer has a tendency to break. The intermediate piece limits the movements of the two oblique support surfaces, and namely pull-out movements. Such a shape is thus suitable to use with composite materials in particular.

Therefore the invention has for object a aircraft pressurized flooring including, pressurized longitudinal beams and curved membranes, each beam including an upper sole, a vertical web plate, and a lower sole, said lower sole being provided with two oblique feet arranged on both sides of the vertical web plate and presenting a support surface on which the pressurized curved membranes are attached, characterized in that the beams are in composite material, and in that the lower sole of the beams includes an linking element connecting the two oblique feet, so that said lower sole presents an enclosed section.

The beam according to the invention can be realized in composite material.

As an example of a particular embodiment of the beam according to the invention, the link element includes a horizontal surface, two opposed linking edges of said horizontal surface being each united to a lower extremity of one oblique foot, so that the enclosed section forms a triangle.

In another example of embodiment, the linking element may include two oblique surfaces, one linking edge of each oblique surface being united to a lower extremity of one oblique foot, both oblique surfaces being united to one another by their converging edges opposed to the linking edges, so that the enclosed section forms a lozenge. It is also possible to realize other shapes of enclosed section for the lower sole, such as a hexagon, by multiplying the number of oblique and/or horizontal surfaces of the linking element.

The vertical web plate crosses the enclosed section. Indeed, the presence of the vertical web plate extending from the junction node between said web plate and the two oblique feet, down to within the internal volume of the lower sole, can pick-up at least partially the forces to which the support surfaces of the lower sole are subjected.

The enclosed section may be hollow. Of course, it is possible to realize a lower sole which enclosed section is solid, but this may be detrimental to the beam total mass, and therefore to the pressurized flooring provided with such beams. In addition, using a solid enclosed section may make fastening the curved membranes on the support surfaces of the lower sole more complex.

In a particular example of embodiment of the beam according to the invention, it is possible to provide a reinforcement lodged in the internal volume of the enclosed section. Such reinforcement may be realized notably in composite material. For example, the external contour of the reinforcement matches entirely the internal contour of the enclosed section. It is also possible to use a reinforcement which external contour only partially matches the internal contour of the support surfaces and edges of the linking element. Generally, the reinforcement is particularly useful at the level of the junction node between the vertical web plate and the oblique feet.

The linking element may include at least one through aperture, opening in the internal volume of the enclosed section.

Such through aperture notably facilitates the fastening of the curved membranes on the support surfaces of the lower sole.

BRIEF DESCRIPTION OF THE DRAWINGS

The invention will be better understood by reading the following description and by examining the accompanying figures. These are presented for guidance and are not in any way restrictive of the invention. The figures represent:

FIG. 3 is a view from below of a two beam assembly according to the invention connected to one another by a curved membrane for pressurized floor;

FIGS. 4A and 4B are schematic representations in cross-section of another example of embodiment of a lower sole according to the invention;

FIGS. 5A and 5B are schematic representations in cross-section of another example of embodiment of a lower sole according to the invention;

DETAILED DESCRIPTION OF THE DRAWINGS

Figure 1:
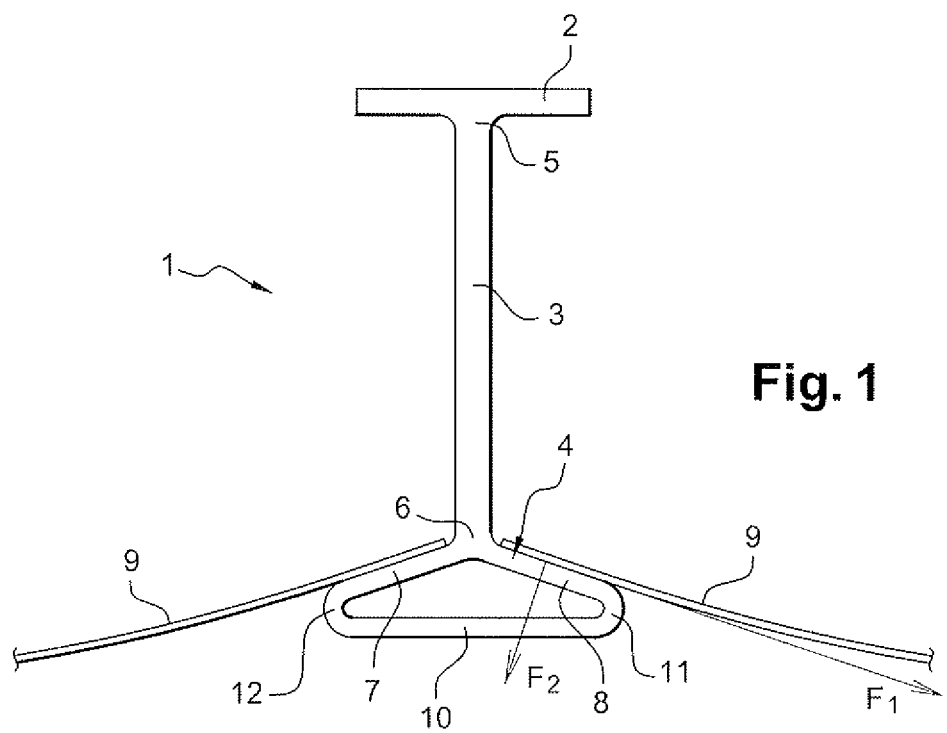
FIG. 1 is a schematic representation in cross section of a beam according to the invention.

In FIG. 1 is an example beam for pressurized flooring is represented according to the invention.

Beam 1 is provided with an upper sole 2, a vertical web plate 3, and a lower sole 4. An upper extremity 5 of vertical web plate 3 is connected to upper sole 2, a lower extremity 6 of vertical web plate 3 being connected to lower sole 4.

Figure 2:
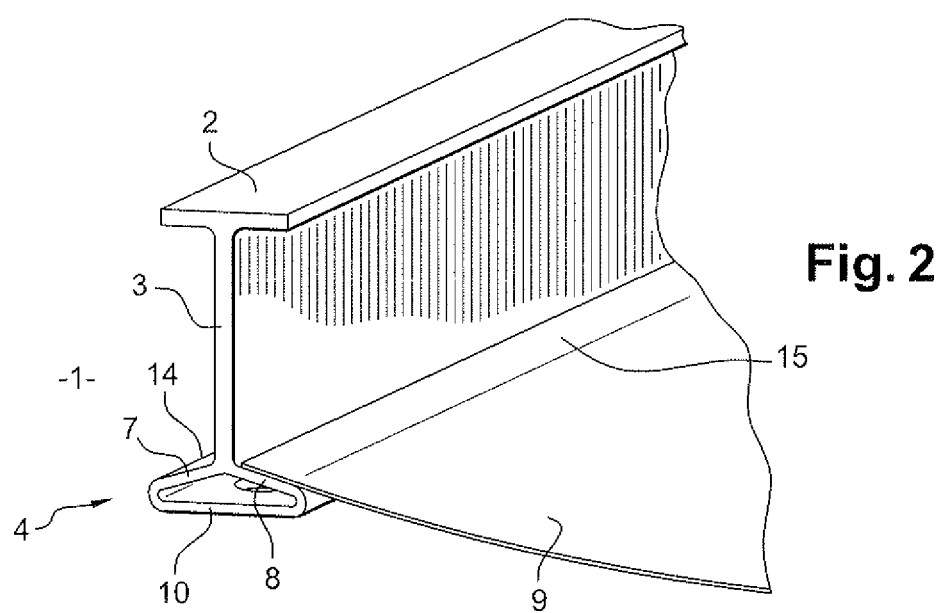
FIG. 2 is a schematic representation in perspective of a beam according to FIG. 1.

As visible in FIG. 2, in a classic manner, upper sole 2 forms a horizontal plane surface, intended to support rails, such as rails for passenger seats.

Vertical web plate 3 extends vertically in relation to the plane of upper sole 2.

Lower sole 4 include two oblique feet 7, 8, arranged on each sides of vertical web plate 3, and each connected to lower extremity 6 of said vertical web plate 3. Lower extremity 6 of the vertical web plate forms thus a junction node between vertical web plate 3 and lower sole 4.

The shape of oblique feet 7, 8 is the same as that of the lower sole feet of the state of the art. Each oblique foot 7, 8 presents therefore at the level of the upper face, i.e. directed toward upper sole 2, a curved support surface 14, 15 on which come to rest a curved membrane 9 of the pressurized flooring to which beam 1 according to the invention is meant to belong.

As visible in FIG. 3, in a pressurized floor, two adjacent beams 1 are connected to one another, at the level of lower sole 4, by a curved membrane 9, and at the level of upper sole 2 by a panel 10.

Curved membranes 9 of the pressurized flooring are submitted to pull-out forces F1 and compression forces F2, said forces being transmitted to curved support surfaces 14, 15 and therefore to oblique feet 7, 8 of lower sole 4.

According to the invention, sole 4 is provided with a linking element 10 forming a horizontal surface, extending parallel to upper sole 2. Linking element 10 connects the two oblique feet 7, 8. More precisely, two junction edges of horizontal surface linking element 10, opposite to one another, are united to the lower extremities of oblique feet 7, 8, opposite to the upper extremities located at the level of junction node 6. Linking element 10 closes the structure lower sole 4, which was open in an inverted V in the state of the art. Lower sole 4 according to the invention delimits an enclosed volume. The cross-section of lower sole 4 has a general triangular shape.

The junction between linking element 10 and each oblique feet 7, 8 form a radius 11, 12 through which pull-out forces F1 and compression force F2 transit to be re-looped into linking element 10. By radius, one understands that the link is not forming an acute angle but rather a smooth curve, less susceptible to breakage. Thus, beam 1 according to the invention is no longer at risk to break at junction node 6 when submitted to forces F1, F2. Support surfaces 14 and 15 being connected to horizontal surface 10, the movements of junction node 6 are limited.

In FIGS. 4A and 4B, a second example of embodiment of a beam 20 for pressurized flooring according to the invention is represented.

Since only lower sole 22 of beam 20 is modified, vertical web plate 21 is only partially represented, the rest of beam 20 is not represented.

Lower sole 22 includes two oblique feet 23, 24 arranged on each sides of vertical web plate 21, forming each a support surface for a curved membrane 9 of the pressurized floor. Lower sole 22 also includes a linking element 25 forming a horizontal surface. As presented above, each linking edge of horizontal surface 25 is connected to a lower extremity of an oblique foot 23, 24, so that the linking zone forms a radius 26, 26' through which the forces transit.

Vertical web plate 21 of beam 20 extends beyond junction node 27 by a vertical bar 28 that entirely crosses internal volume 29 of the enclosed section formed by lower sole 22. Internal volume 29 is delimited respectively by the support surfaces of the oblique feet and horizontal surface 25. The triangular section of sole 22 is crossed from its tip, formed by the junction node 27, down to horizontal surface 25 by vertical bar 28.

By dividing internal volume 29 in two, vertical bar 28 permits reduction of forces F2 exerted on each oblique feet 24, 26. Forces F2 are only partially picked-up by radii 26, 27, the other part of aforesaid forces F2 being picked-up by vertical bar 28. Thus, lower sole 22 resistance to compression forces to which beam 20 can be submitted is increased.

In FIGS. 5A and 5B, another example of embodiment of a beam 30 for pressurized flooring is represented according to the invention.

Linking element 33 between oblique feet 34, 35 of lower sole 32 include two planar portions, also oblique, 36 and 37 respectively. Each oblique surface 36, 37 is united, by a junction edge, to the lower extremity of oblique foot 34, 35 having an opposite orientation. Each junction zone between an oblique surface 36, 37 and an oblique foot 34, 35 forms a radius 38, 39 through which the forces exerted on the curved support surface of oblique feet 34, 35 can transit. Both oblique surfaces 36, 37 are connected to one another at the opposite edges, in order to form a second junction node 40. Internal volume 42 of the enclosed section of lower sole 32, delimited by oblique feet 34, 35 and both oblique surfaces 36, 37, has a general lozenge shape.

In the example represented in FIGS. 5A and 5B, vertical web plate 31 of sole 30 extends beyond junction node 41 with a vertical bar 43. Vertical bar 43 crosses internal volume 42 of enclosed section 32. Vertical bar 43 is united to both oblique feet 34, 35 at the level of first junction node 41, and to both oblique surfaces 36, 37 at the level of second junction point 40. Vertical bar 43 can pick-up at least partially the forces exerted on the curved support surfaces of oblique feet 34, 35.

As represented in FIGS. 3, 4B and 5B, it is possible to prepare one or more through apertures 13 on linking element 10, 25, 33 connecting oblique feet 7, 8, 23, 24, 34, 35. Aperture 13 provides an access to internal volume 29, 42 of the enclosed section formed by lower sole 4, 22, 32 from linking element 10, 25, 33. Thus, one easily accesses fasteners uniting curved membranes 9 to the corresponding oblique feet. In addition, by multiplying the number of through apertures 13, the total mass of the whole structure forming the beam for a flooring according to the invention is decreased.

In case internal volume 29, 42 of the enclosed section formed by lower sole 22, 32 is divided in two by a vertical bar 28, 43, two rows of through apertures 13 are advantageously provided in order to have through apertures 13 opening in each of the two internal half volumes of lower sole 22, 32. Through apertures 13 are advantageously distributed regularly on the linking element of the lower sole in order to provide an easy access to each fastening point of curved membranes 9 to lower sole 4, 22, 32.

Advantageously, in case the beam according to the invention is realized in composite material, it is possible to provide a reinforcement arranged in the internal volume of the enclosed section formed by the lower sole, in order to pick-up the forces to which the support surfaces of the oblique feet are partially submitted to.

Figure 6A:
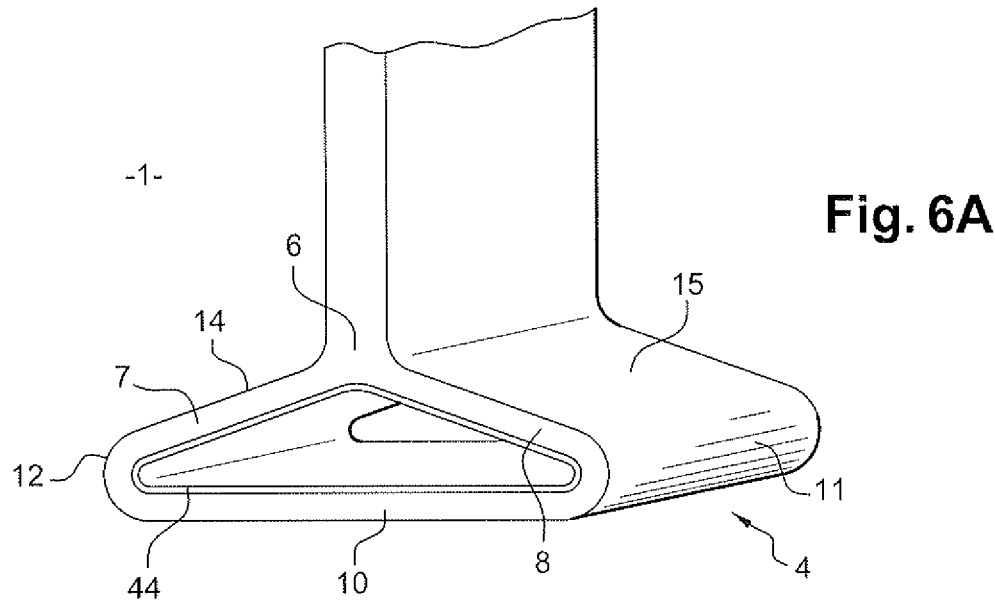
FIGS. 6A and 6B are two examples of embodiment of a reinforcement for lower sole according to the invention.

In the example represented in FIG. 6A, reinforcement 44 has a triangular section. The external contour of reinforcement 44 follows an internal contour of the internal volume of the enclosed triangular section of lower sole 4, and matches precisely the internal wall of support surfaces 14, 15 and of horizontal surface 10 delimiting the internal volume of said enclosed section.

Within horizontal surface 10 is provided with through apertures (not represented in FIG. 6A), reinforcement 44 is advantageously provided with similar holes, intended to coincide with the through apertures of horizontal surface 10, in order to provide an access to the internal volume.

Within reinforcement 44 is made of composite material, fibers are used, mainly oriented at 90° and +/−45°, while decreasing maximally the quantity of fibers at 0°, since fibers in this orientation, i.e. extending along the longitudinal axis of the beam, are not intended to be called upon when lower sole 4 is submitted to compression forces F2 and pull-out forces F1. Therefore a continuity of fibers is created between the fibers of oblique feet 23, 24 of the beam made of composite material, which provides reinforcement of junction node 6 of the two feet 7, 8.

Figure 6B:
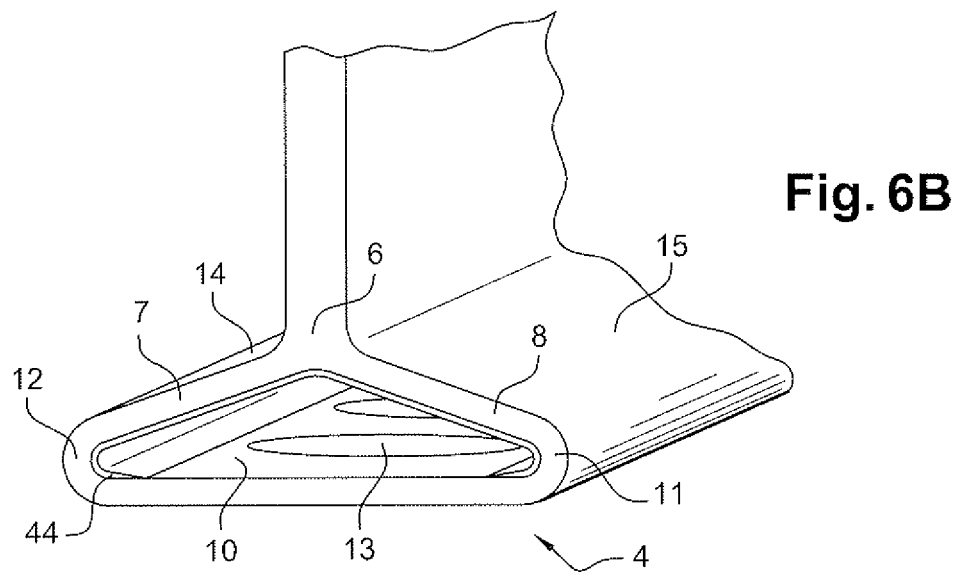

In the example represented in FIG. 6B, reinforcement 44 doesn't follow entirely the internal contour of the triangular enclosed section of lower sole 4. Indeed, reinforcement 44 is made of a preformed shape only matching the internal wall of oblique feet 7, 8 and radii 11, 12. The preformed shape does not have an enclosed section, since it does not cover the internal wall of horizontal surface 10. Such a solution also provides satisfactory results, since these mainly junction node 6 and radii 11, 12 are intended to pick-up the forces.

Of course such reinforcement 44 can be used in a similar manner with other examples of embodiment represented in FIGS. 4A and 5A.

Within beam 1, 20, 30 according to the invention is realized in a composite material, it can be made in a classic fashion by injecting or infusing resin. The hollow enclosed section is realized using an extractible or soluble nucleus. Carbon epoxy is preferably used, with carbon fibers oriented in four directions, i.e. 0°, 90° and +/−45°. It is also possible to realize such beams according to the invention using pre-impregnated fibers.

The invention claimed is:

1. An aircraft pressurized flooring, comprising: longitudinal beams each having a longitudinal axis and including a first longitudinal beam spaced apart from a second longitudinal beam and pressure resisting curved membranes, each beam, when viewed in a cross section taken perpendicular to the longitudinal axis, including an upper sole, a vertical web plate, and a lower sole, said lower sole having two oblique feet arranged on both sides of the vertical web plate, and each oblique foot presenting a support surface on which the pressure resisting curved membranes are attached, one of the pressure resisting curved membranes extending between one of the oblique feet of the first longitudinal beam and one of the oblique feet of the second longitudinal beam, wherein the beams are formed from composite material, and wherein the lower sole of the beams includes a linking element connecting the two oblique feet, so that said lower sole presents an enclosed section.

2. A floor for a pressurized aircraft comprising:
longitudinal beams each having a longitudinal axis and including a first longitudinal beam spaced apart from a second longitudinal beam; and
curved pressure resisting membranes
each beam, when viewed in a cross section, having an upper sole, a vertical web plate, and a lower sole, the lower sole including two oblique feet extending from the sides of the vertical web plate, each oblique foot presenting a support surface on which the curved pressure resisting membranes are attached, wherein the beams are formed from composite material, one of the pressure resisting curved membranes extending between one of the oblique feet of the first longitudinal beam and one of the oblique feet of the second longitudinal beam, and wherein the lower sole of the beams includes a linking element connecting outer edges of the two oblique feet, so that said lower sole presents an enclosed section.

3. Flooring according to claim 1, wherein the linking element includes a horizontal surface, two opposed linking edges of said horizontal surface being each united to a lower extremity of one oblique foot, so that the enclosed section forms a triangle.

4. Flooring according to claim 1, wherein the linking element includes two oblique surfaces, one linking edge of each oblique surface being united to one lower extremity of an oblique foot, both oblique surfaces being united to one another by their opposed converging edges to the linking edges, so that the enclosed section forms a lozenge.

5. Flooring according to claim 1, wherein the vertical web plate crosses the enclosed section.

6. Flooring according to claim 1, wherein the enclosed section is hollow.

7. Flooring according to claim 6, wherein the lower sole includes a reinforcement lodged within the internal volume of the enclosed section.

8. Flooring according to claim 7, wherein an external contour of the reinforcement matches an internal contour of the enclosed section.

9. Flooring according to claim 7, wherein an external contour of the reinforcement matches an internal contour of the support surfaces and linking edges of the linking element.

10. Flooring according claim 7, wherein the reinforcement is made of composite material.

11. Flooring according to claim 1, wherein the linking element includes at least one through aperture that allows access to the internal volume of the enclosed section.

12. A floor according to claim 2, wherein the linking element comprises a horizontal surface having two opposed linking edges that are each united to a lower extremity of one oblique foot, so that the enclosed section forms a triangle.

13. A floor according to claim 2, wherein the linking element includes two oblique surfaces each having a linking edge, one linking edge of each oblique surface being united to one lower extremity of an oblique foot, both oblique surfaces being united to one another by opposed converging edges extending inwardly from the linking edges, so that the enclosed section forms a lozenge shape.

14. A floor according to claim 2, wherein the vertical web plate extends across the enclosed section.

15. A floor according to claim 2, wherein the enclosed section is hollow.

16. A floor according to claim 15, wherein the lower sole includes a reinforcement within the internal volume of the enclosed section.

17. A floor according to claim 16, wherein an external contour of the reinforcement matches an internal contour of the enclosed section.

18. A floor according to claim 16, wherein an external contour of the reinforcement matches an internal contour of the support surfaces and the linking edges of the linking element.

19. A floor according to claim 16, wherein the reinforcement is made of composite material.

20. A floor according to claim 2, wherein the linking element includes at least one through aperture that provides access to the internal volume of the enclosed section.

* * * * *